(12) United States Patent
Cordill et al.

(10) Patent No.: US 11,067,666 B2
(45) Date of Patent: Jul. 20, 2021

(54) SELF-COMPENSATING RADAR SYSTEM

(71) Applicant: The Boeing Company, Chicago, IL (US)

(72) Inventors: Brian D. Cordill, San Pedro, CA (US); James Douglas Franklin, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 515 days.

(21) Appl. No.: 15/991,659

(22) Filed: May 29, 2018

(65) Prior Publication Data
US 2019/0369210 A1 Dec. 5, 2019

(51) Int. Cl.
G01S 7/40 (2006.01)
G01S 7/28 (2006.01)

(52) U.S. Cl.
CPC .......... *G01S 7/4008* (2013.01); *G01S 7/2813* (2013.01)

(58) Field of Classification Search
None
See application file for complete search history.

(56) References Cited

U.S. PATENT DOCUMENTS

| 4,968,968 | A | 11/1990 | Taylor |
| 7,570,201 | B1 | 8/2009 | Watkins et al. |
| 8,634,793 | B2 * | 1/2014 | Landmark ................ H04B 1/30 455/295 |
| 2016/0077196 | A1 | 3/2016 | Dehlink et al. |

OTHER PUBLICATIONS

Extended European Search Report dated Oct. 15, 2019 for European Patent Application No. 19175882.0, 9 pages.

* cited by examiner

*Primary Examiner* — Whitney Moore
(74) *Attorney, Agent, or Firm* — Sage Patent Group

(57) ABSTRACT

A method for self-calibrating a radar system includes forming a calibration loop-back signal path. The calibration loop-back signal path is configured for determining a passband response of each of a radio frequency (RF) signal path, a local oscillator (LO) signal path, and an intermediate frequency (IF) signal path of the radar system. The method also includes transmitting a set of calibration signals into the RF signal path and the LO signal path and measuring output signals from the IF signal path in a receiver of the radar system. The method further includes determining the passband response of each of the RF signal path, the LO signal path and the IF signal path from the measured output signals and compensating for distortions and/or non-linearities in the signal paths using the passband response of each signal path.

20 Claims, 9 Drawing Sheets

SELF-COMPENSATING RADAR SYSTEM

FIELD

The present disclosure relates to radars and radar systems and more particularly to a self-compensating radar system or auto-regenerative radar system.

BACKGROUND

Existing techniques for calibrating radar systems include external calibration techniques or internal calibration techniques. Each of these techniques has significant drawbacks. External calibration methods require external test and support equipment. This equipment either needs to be transported to the radar site, which is costly and difficult as the equipment is extremely sensitive, or the radar needs to be transported into a laboratory environment, which may not be practical and requires the radar to be out of operation for an extended period of time. In either case calibration cannot be performed during operational periods of the radar system and the radar's data may degrade during the time period between calibrations.

SUMMARY

In accordance with an embodiment, a method for self-calibrating a radar system includes forming a calibration loop-back signal path. The calibration loop-back signal path is configured for determining a passband response of each of a radio frequency (RF) signal path, a local oscillator (LO) signal path, and an intermediate frequency (IF) signal path of the radar system. The method also includes transmitting a set of calibration signals into the RF signal path and the LO signal path. The method additionally includes measuring output signals from the IF signal path in a receiver of the radar system in response to the signals transmitted into the RF signal path and the LO signal path. The method additionally includes determining the passband response of each of the RF signal path, the LO signal path and the IF signal path from the measured output signals. The method further includes compensating for distortions and/or non-linearities in the RF signal path, the LO signal path and the IF signal path using the passband response of each signal path.

In accordance with another embodiment, a method for self-calibrating a radar system includes coupling a coupled transmit/local oscillator (TX/LO) waveform generator to a self-compensation structure by a calibration loop-back signal path. The calibration loop-back signal path is configured for determining a passband response of each of a radio frequency (RF) signal path, a local oscillator (LO) signal path, and an intermediate frequency (IF) signal path, wherein the coupled TX/LO waveform generator and the self-compensation structure are components of an exciter/receiver of the radar system. The method also includes transmitting a first set of calibration signals into the RF signal path and the LO signal path by the coupled TX/LO waveform generator and measuring output signals from the IF signal path by the self-compensation structure in response to the first set of calibration signals. The method additionally includes transmitting a second set of calibration signals into the RF signal path and the LO signal path by the coupled TX/LO waveform generator and measuring output signal from the IF signal path by the self-compensation structure in response to the second set of calibration signals. The method additionally includes determining the passband response of each of the RF signal path, the LO signal path and the IF signal path from the measured output signals by the self-compensation structure. The method further includes compensating for distortions and/or non-linearities in the RF signal path, the LO signal path and the IF signal path by the self-compensation structure using the passband response of each signal path.

In accordance with another embodiment, a radar system includes a transmit assembly and a receive assembly. The radar system also includes a calibration loop-back signal path formed in response to a switching device being operated to couple the transmit assembly to the receive assembly. The calibration loop-back signal path is configured for determining a passband response of each of a radio frequency (RF) signal path, a local oscillator (LO) signal path, and an intermediate frequency (IF) signal path of the radar system. The radar system also includes a coupled transmit/local oscillator (TX/LO) waveform generator configured for transmitting a set of calibration signals into the RF signal path and the LO signal path. The radar system further includes a self-compensation structure configured to perform a set of functions including measuring output signals from the IF signal path in response to the calibration signals; determining the passband response of each of the RF signal path, the LO signal path and the IF signal path from the measured output signals; and compensating for distortions and/or non-linearities in the RF signal path, the LO signal path and the IF signal path using the passband response of each signal path.

In accordance with an embodiment and any of the previous embodiments, forming the calibration loop-back signal path includes operating a switching device to electrically connect the transmit assembly to the receive assembly of the radar system.

In accordance with an embodiment and any of the previous embodiments, transmitting the set of calibration signals into the RF signal path and the LO signal path includes transmitting a set of RF calibration signals into the RF signal path by the coupled TX/LO waveform generator and transmitting an LO calibration signal into the LO signal path by the coupled TX/LO waveform generator.

In accordance with an embodiment and any of the previous embodiments, the set of calibration signals each include a linear frequency modulated (LFM) pulse waveform.

In accordance with an embodiment and any of the previous embodiments, compensating for distortions and/or non-linearities is performed in an exciter/receiver of the radar system using only devices that are components of the radar system.

In accordance with an embodiment and any of the previous embodiments, determining the passband response of each of the RF signal path, the LO signal path and the IF signal path includes determining an amplitude and phase response resulting from a transfer function corresponding to each of the signal paths.

In accordance with an embodiment and any of the previous embodiments, determining the passband response of each of the RF signal path, the LO signal path and the IF signal path includes performing one of a point-by-point analysis or a least squares analysis on the measured output signals.

In accordance with an embodiment and any of the previous embodiments, determining the passband response of each of the RF signal path, the LO signal path and the IF signal path includes performing the least squares analysis on the measured output signals respectively through the RF and LO signal paths for a predetermined frequency range.

In accordance with an embodiment and any of the previous embodiments, compensating for distortions and/or non-linearities in each of the signal paths includes generating a compensation filter that compensates for the distortions and/or non-linearities caused by hardware components of each of the signal paths.

In accordance with an embodiment and any of the previous embodiments, compensating for distortions and/or non-linearities in each of the signal paths includes determining filter parameters or characteristics using the passband response of each signal path.

In accordance with an embodiment and any of the previous embodiments, wherein the method or set of functions further includes adjusting or setting the parameters in the compensation filter and filtering radar signals received by the radar system by the compensation filter before processing the filtered radar signals.

In accordance with an embodiment and any of the previous embodiments, the exciter/receiver includes the coupled TX/LO waveform generator and the self-compensation structure.

In accordance with an embodiment and any of the previous embodiments, the self-compensation structure includes a compensation filter configured for compensating for distortions and/or non-linearities in the RF signal path, the LO signal path and the IF signal path using the passband response of each signal path.

The features, functions, and advantages that have been discussed can be achieved independently in various embodiments or may be combined in yet other embodiments further details of which can be seen with reference to the following description and drawings.

DETAILED DESCRIPTION

Figure 1:
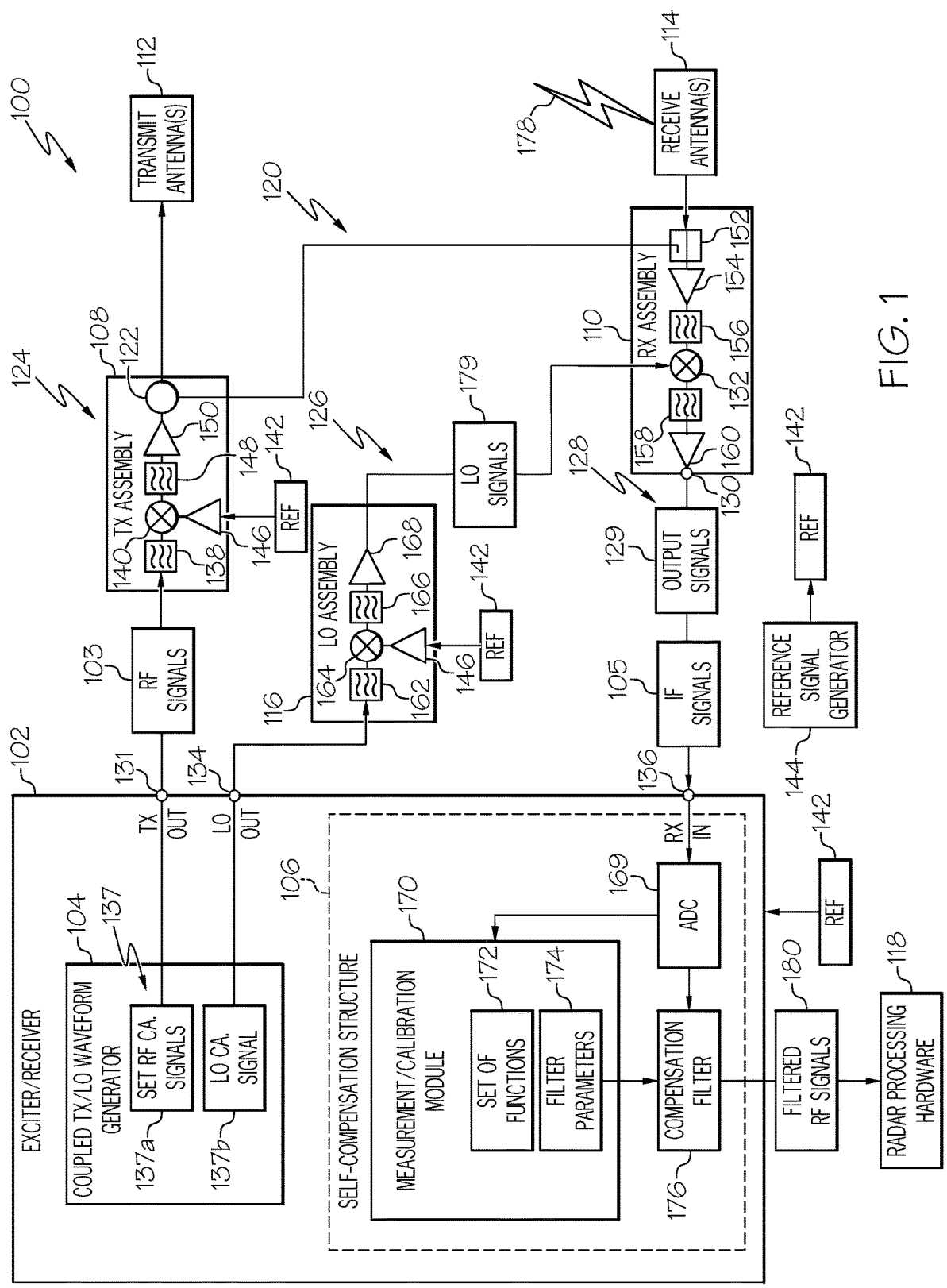
FIG. 1 is a block schematic diagram of an example of a self-compensating radar system in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

FIG. 1 is a block schematic diagram of an example of a self-compensating radar system 100 in accordance with an embodiment of the present disclosure. The radar system 100 includes an exciter/receiver 102 that includes components for transmitting radio frequency (RF) signals 103 and receiving intermediate frequency (IF) signals 105 or baseband signals. The exciter/receiver 102 includes a coupled transmit/local oscillator (TX/LO) waveform generator 104 and a self-compensation structure 106.

The radar system 100 also includes a transmit (TX) assembly 108 operatively connected to the coupled TX/LO waveform generator 104 and a receive (RX) assembly 110 that is operatively connected to the self-compensation structure 106 of the exciter/receiver 102. The transmit assembly 108 is also operatively connected to one or more transmit antennas 112 for transmitting RF signals or radar signals generated by the exciter/receiver 102 or the coupled TX/LO waveform generator 104. The receive assembly 110 is operatively connected to one or more receive antennas 114 for receiving return or reflected radar signals 178 from targets (not shown).

The radar system 100 also includes a local oscillator (LO) assembly 116. The LO assembly 116 is operatively connected between the coupled TX/LO waveform generator 104 and the receive assembly 110. Return or reflected radar signals 178 are mixed with LO signals 179 from the LO assembly 116 in the receive assembly 110 to convert the RF radar signals 178 to IF signals 105 or baseband signals for processing by the exciter/receiver 102 and radar processing hardware 118.

Figure 3:
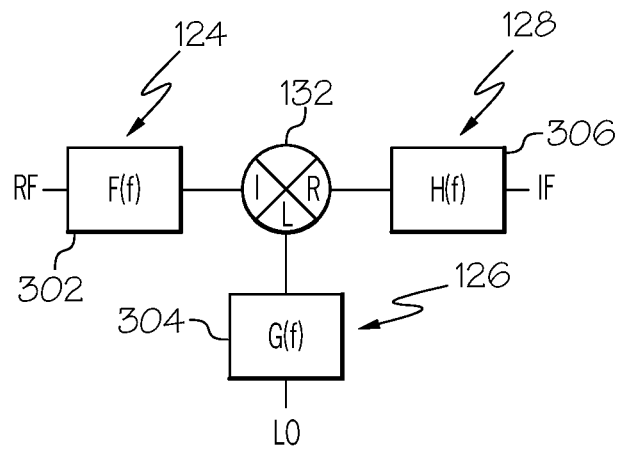
FIG. 3 is a block diagram of the radio frequency (RF) signal path, local oscillator (LO) signal path and intermediate frequency (IF) signal path of the exemplary radar system in FIG. 1 represented as transfer functions in accordance with another embodiment of the present disclosure.

The radar system 100 also includes a calibration loop-back signal path 120. In accordance with an embodiment, the calibration loop-back signal path 120 is formed in response to a switching device 122 being operated to couple the transmit assembly 108 to the receive assembly 110. The calibration loop-back signal path 120 is configured for determining a passband response of each of a radio frequency (RF) signal path 124, a local oscillator (LO) signal path 126, and an intermediate frequency (IF) signal path 128 of the radar system 100. Referring also to FIG. 3, FIG. 3 is a block diagram of the RF signal path 124, LO signal path 126 and IF signal path 128 of the exemplary radar system 100 in FIG. 1 respectively represented as transfer functions 302, 304 and 306 in accordance with an embodiment of the present disclosure. Determining the passband response of each of the signal paths 124, 126 and 128 includes determining an amplitude and phase response resulting from the transfer function 302, 304 and 306 corresponding to each signal path 124, 126 and 128 in response to calibration signals 137 or sets of the calibration signals 137 being transmitted through the RF signal path 124 and the LO signal path 126 and measuring and analyzing output signals 129 from an output 130 of the IF signal path 128 by the self-compensation structure 106. In accordance with an embodiment, the passband responses of each of the RF signal path 124, LO signal path 126 and IF signal path 128 are determined by performing a point-by-point analysis on the measured output signals 129. An example of performing a point-by-point analysis on the measured output signals 129 is described with reference to FIGS. 6A and 6B. In accordance with another embodiment, the passband responses of the signal paths 124, 126 and 128 are determined by performing a least square analysis on the measured output signals 129 respectively through the RF signal path 124 and the LO signal path 126 for a predetermined frequency range. An example of performing a least square analysis on the measured output signals 129 is described with reference to FIGS. 8A and 8B. The passband response or amplitude and phase response resulting from the transfer function 306 for the IF signal path 128 is determined from the passband responses or amplitude and phase responses resulting from the transfer functions 302 and 304 of the RF and LO signal paths 124 and 126 as described with respect to FIGS. 6A and 6B and FIGS. 8A and 8B.

Figure 4:
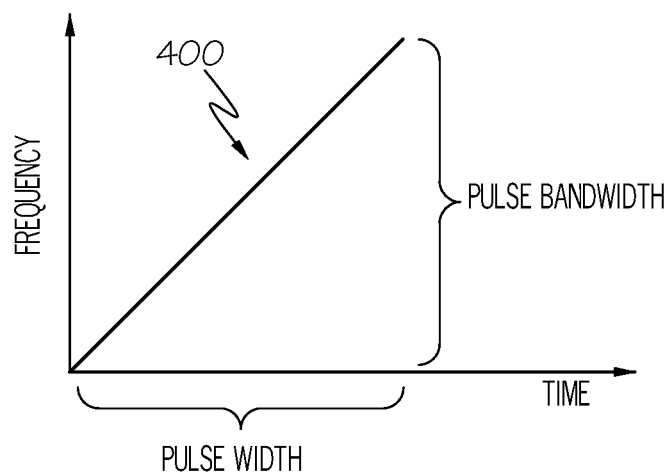
FIG. 4 is an illustration of a linear frequency modulated (LFM) pulse waveform in accordance with an embodiment of the present disclosure.

In accordance with an embodiment, the RF signal path 124 is defined between a TX output 131 of the coupled TX/LO waveform generator 104 and a receive mixer 132 of the receive assembly 110, when the calibration loop-back signal path 120 is formed or connected. The LO signal path 126 is defined between an LO output 134 of the coupled TX/LO waveform generator 104 and the receive mixer 132 of the receive assembly 110. The IF signal path 128 is defined between the receive mixer 132 and the self-compensation structure 106 or receive (RX) input 136 of the exciter/receiver 102. The coupled TX/LO waveform generator 104 is configured for transmitting two different sets of calibration signals 137 into the RF signal path 124 and the LO signal path 126 for self-calibration of the radar system 100 as described in more detail with reference to FIG. 2. In accordance with the embodiment illustrated in FIG. 1, each set of calibration signals 137 include a set of RF calibration signals 137a transmitted into the RF signal path 124 and a single LO calibration signal 137b transmitted into the LO signal path 126 to determine a passband response of the RF signal path 124 and the LO signal path 126 during self-calibration of the radar system 100. In another embodiment, more than a single LO calibration signal 137b may be transmitted into the LO signal path 126. In accordance with an example, the calibration signals 137 each include a linear frequency modulated (LFM) waveform. Referring also to FIG. 4, FIG. 4 is an illustration of a linear frequency modulated (LFM) pulse waveform 400 in accordance with an embodiment of the present disclosure. In FIG. 4, the vertical axis is frequency and the horizontal axis is time. In accordance with another embodiment, a set of LO calibration signals 137b are transmitted into the LO signal path 126 and at least a single RF calibration signal 137a is transmitted into the RF signal path 126 to determine the passband response of the RF signal path 124 and LO signal path 126 during self-calibration of the radar system 100.

Figure 5:
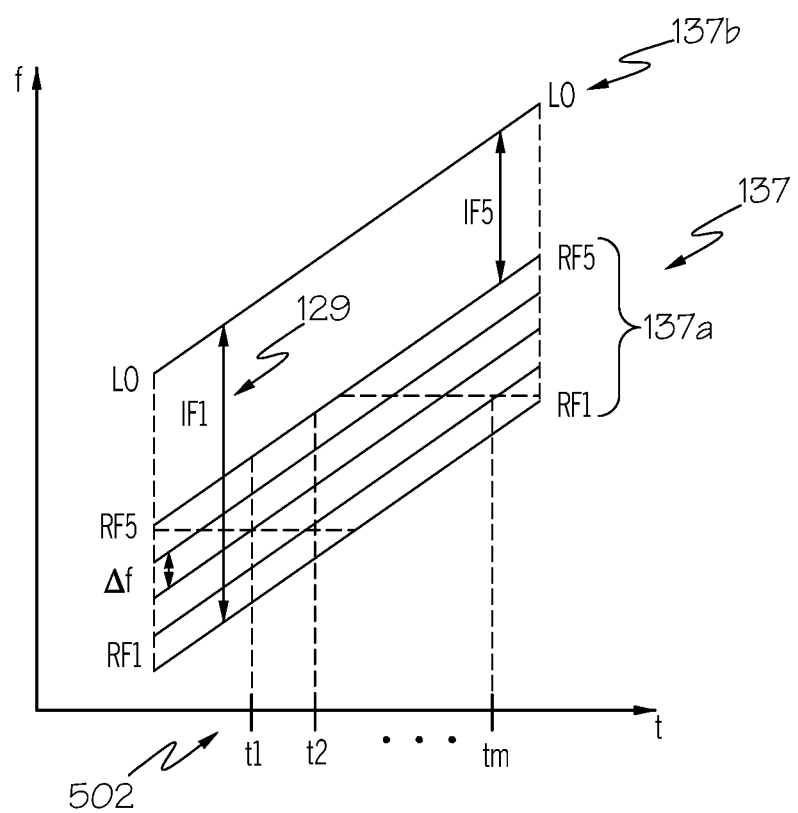
FIG. 5 is an illustration of a set of calibration signals transmitted into the RF and LO signal paths for determining or characterizing a passband response of each signal path in accordance with an embodiment of the present disclosure.

Referring also to FIG. 5, FIG. 5 is an illustration of a set of RF calibration signals 137a transmitted into the RF signal path 124 and a single LO calibration signal 137b transmitted into the LO signal path 126 for determining or characterizing a passband response of each signal path 124, 126 and 128 in accordance with an embodiment of the present disclosure. The set of RF calibration signals 137a are transmitted by the coupled TX/LO waveform generator 104 into the RF signal path 124 and the single LO calibration signal 137b is transmitted by the waveform generator 104 into the LO signal path 126 for determining the passband response of each signal path 124, 126 and 128 and using the passband responses to compensate for distortions and/or non-linearities in the signal paths 124, 126 and 128. In the example illustrated in FIG. 5, the set of RF calibration signals 137a include five LFM pulse waveforms ($RF_1$-$RF_5$) and the LO calibration signal 137b includes a single LFM pulse waveform (LO).

In accordance with the exemplary embodiment illustrated in FIG. 1, the transmit assembly 108 includes a first transmit filter 138 that receives RF signals 103 from the exciter/receiver 102. The first transmit filter 138 is configured to remove any spurious signals that may be in the waveform generated by the coupled TX/LO waveform generator 104. An RF mixer 140 mixes the filtered RF signals with a reference signal 142 from a reference signal generator 144. The reference signal 142 may be amplified by a reference signal amplifier 146. The mixed signal from the RF mixer 140 is filtered by a second transmit filter 148 and amplified by a transmit amplifier 150. The second transmit filter 148 is configured to remove any non-linear mixing products that may be in the signal produced by the RF mixer 140. The switching device 122 includes a normal operating position or mode that transmits the RF signals to the one or more transmit antennas 112 and a self-calibration position or mode to configure the calibration loop-back signal path 120 by connecting the transmit assembly 108 to the receive assembly 110 for self-calibration of the radar system 100. In accordance with other embodiments, the transmit assembly 108 may include a different arrangement of components.

In accordance with the exemplary embodiment illustrated in FIG. 1, the receive assembly 110 includes a coupler 152 that forms part of the calibration loop-back signal path 120 and also receives return or reflected radar signals 178 or RF signals from the one or more receive antennas 114. A first receive amplifier 154 amplifies the RF signals from the coupler 152 and a first receive filter 156 filters the amplified RF signals passed to the receive mixer 132. The first receive filter 156 is configured to remove any undesirable out-of-band interference signals that may be in the radar signal 178. The receive mixer 132 mixes the RF signals from the first receive filter 156 with LO signals 179 from the LO assembly 116 to convert the RF signals to IF signals 105. The IF signals 105 from the receive mixer 132 are filtered by a second receive filter 158 and are amplified by a second receive amplifier 160. The second receive filter 158 is configured to remove any undesirable mixing products that may be in the signal produced by the receive mixer 132. The IF signals 105 from the receive assembly 110 are transmitted to the receive input 136 of the exciter/receiver 102. In accordance with other embodiments, the receive assembly 110 may include a different arrangement of components.

In accordance with the exemplary embodiment illustrated in FIG. 1, the LO assembly 116 includes a first LO filter 162 that receives signals from the coupled TX/LO waveform generator 104. The first LO filter 162 is configured to remove any spurious signals that may be in the waveform from the coupled TX/LO waveform generator 104. An LO mixer 164 mixes the filtered signals with the reference signal 142 from the reference signal generator 144. The reference signal 142 is amplified by a reference signal amplifier 146. A second LO filter 166 filters the mixed LO signals 179 and an LO amplifier 168 amplifies the mixed LO signals 179 which are transmitted to the receive mixer 132. The second LO filter 166 is configured to remove any non-linear mixing products that may be in the signals from the LO mixer 164.

In accordance with other embodiments, the LO assembly 116 may include a different arrangement of components.

In accordance with another embodiment, the coupler 152 may replace the switching device 122 in the transmit assembly 108 and the switching device 122 may replace the coupler 152 in the receive assembly 110. In a further embodiment, the switching device 122 may be replaced by a coupler similar to coupler 152 in the transmit assembly 108 and the switching device 122 may be located in the calibration loop-back signal path 120 between the transmit assembly 108 and the receive assembly 110. Any arrangement of components to form the calibration loop-back signal path 120 may be used.

In accordance with an embodiment, the self-compensation structure 106 includes an analog-to-digital converter (ADC) 169 to sample or digitize the IF signals 105 from the receive assembly 110. The self-compensation structure 106 additionally includes a measurement/calibration module 170 that receives the sampled or digitized signals from the ADC 169. The self-compensation structure 106 or measurement/calibration module 170 is configured to perform a set of functions 172 including measuring output signals from the IF signal path 128 in response to the calibration signals 137 from the coupled TX/LO waveform generator 104 and determining the passband response of each of the RF signal path 124, the LO signal path 126 and the IF signal path 128 from the measured output signals 129. The Self-compensation structure 106 further performs the function of compensating for distortions and/or non-linearities in the RF signal path 124, the LO signal path 126 and the IF signal path 128 using the passband response of each signal path 124, 126 and 128. Compensating for distortions and/or non-linearities in each of the signal paths 124, 126 and 128 includes determining filter parameters 174 or characteristics using the passband response of each signal path 124, 126 and 128. The set of functions 172 of the measurement/calibration module 170 estimates the passband responses of the signal paths 124, 126 and 128 and generates the filter parameters 174 that are applied to the compensation filter 176. In accordance with an embodiment, the compensation filter 176 is implemented digitally. In accordance with an embodiment, the set of functions 172 are performed by the method 600 described with reference to FIGS. 6A and 6B. In accordance with another embodiment, the set of functions 172 are by the method 800 described with reference to FIGS. 8A and 8B.

The self-compensation structure 106 further includes a compensation filter 176 configured for compensating for distortions and/or non-linearities in the RF signal path 124, the LO signal path 126 and the IF signal path 128 using the passband response of each signal path 124, 126 and 128. To compensate for distortions and/or non-linearities in the signal paths 124, 126 and 128, the compensation filter 176 needs to include a transfer function that provides a passband response that is equal to the inverse of the hardware passband response of the signal paths 124, 126 and 128 that imparted the distortions and/or non-linearities in the first place. In accordance with an example, the transfer function of the compensation filter 176 may be characterized by Equation 1:

$$H(z) = \frac{B(z)}{A(z)} = \frac{b_0 + b_1 z^{-1} + b_2 z^{-2} + \cdots + b_N z^{-N}}{1 + a_1 z^{-1} + a_2 z^{-2} + \cdots + a_M z^{-M}} \quad \text{Equation 1}$$

The transfer function in Equation 1 is solved for a set of coefficients ($b_0$, $b_1$, $b_2$, ... $b_N$ and $a_1$, $a_2$, ... $a_M$) that will produce the inverse passband response of the signal paths 124, 126 and 128. The set of coefficients corresponds to the filter parameters 174. The filter parameters 174 are used to adjust the compensation filter 176 or generate the compensation filter 176 for compensating for the distortions or non-linearities in the signal paths 124, 126 and 128 caused by the hardware components of each of the signal paths. Other implementations of the compensation filter 176 that provide an inverse of the passband response of the signal paths 124, 126 and 128 may also be used. Accordingly, the self-compensation structure 106 is configured to estimate the passband response of the signal paths 124, 126 and 128, calculate or determine the inverse of the passband response of the signal paths 124, 126 and 128 and solve for a set of filter coefficients or filter parameters 174 that will produce the inverse passband response to compensate for the distortions and/or non-linearities in the signal paths 124, 126 and 128 of the radar system 100.

In accordance with the exemplary embodiment in FIG. 1, compensating for distortions and/or non-linearities is performed in the exciter/receiver 102 of the radar system 100 without any devices that are not components of the radar system 100. In other words, the radar system 100 is self-compensating and avoids using devices that are not components of the radar system 100. The compensation for distortions and/or non-linearities is performed by only components contained with the exciter/receiver 102 of the radar system 100. This avoids using external test and support equipment having to be transported to the site of the radar system 100 or the radar system 100 having to be transported to a location where the compensation can be performed and an extensive period of time when the radar system is not operable.

The switching device 122 is operated to a normal operating position or mode to disconnect or open the calibration loop-back signal path 120. Radar signals 178 received by the radar system 100 are filtered by the adjusted or calibrated compensation filter 176 to compensate for the distortions and/or non-linearities caused by the hardware components of the RF signal path 124, LO signal path 126 and IF signal path 128 before processing the filtered RF signals 180 by the radar processing hardware 118.

Figure 2:
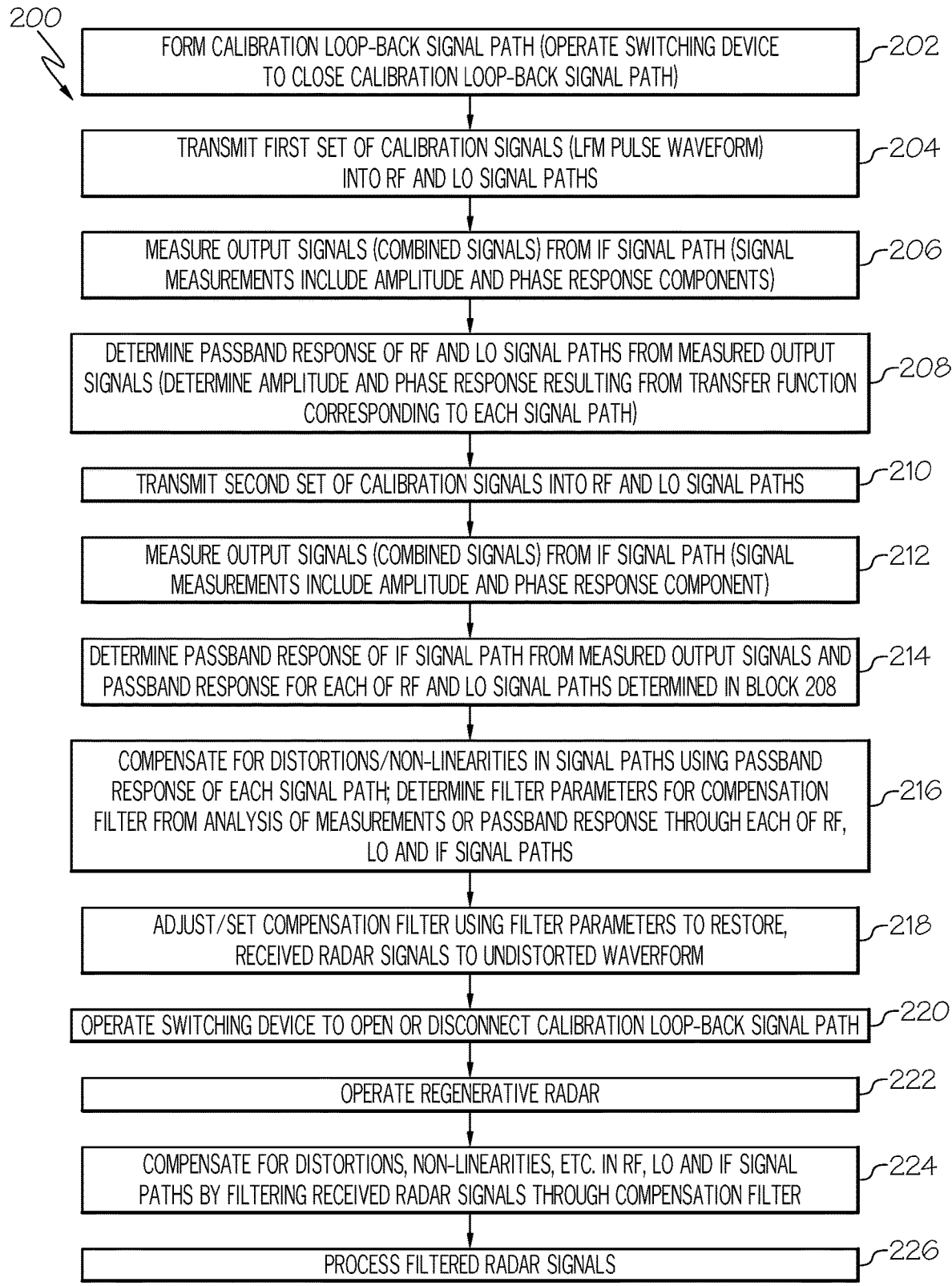
FIG. 2 is a flow chart of an example of a method for self-compensation or auto-regeneration of a radar system in accordance with an embodiment of the present disclosure.

FIG. 2 is a flow chart of an example of a method 200 for self-compensation or auto-regeneration of a radar system in accordance with an embodiment of the present disclosure. In accordance with an embodiment, the method 200 is embodied in and performed by the radar system 100 of FIG. 1. In block 202, a calibration loop-back signal path is formed by operating a switching device to a self-calibration position or mode to electrically connect a transmit assembly to a receive assembly of the radar system. The calibration loop-back signal path is configured for determining a passband response of each of an RF signal path, an LO signal path, and an IF signal path of the radar system.

In block 204, a first set of calibration signals are transmitted respectively into the RF signal path and the LO signal path. In accordance with an embodiment, transmitting the first set of calibration signals includes transmitting a set of RF calibration signals into the RF signal path by a coupled TX/LO waveform generator and transmitting at least a single LO calibration signal into the LO signal path by the coupled TX/LO waveform generator. In accordance with an example, the set of calibration signals each include a linear frequency modulated (LFM) pulse waveform.

In block 206, output signals or combined signals are measured at an output of the IF signal path in a receiver or exciter/receiver of the radar system in response to the calibration signals transmitted into the RF signal path and the LO signal path. The measured signals include an amplitude and phase response component.

In block 208, the passband response of each of the RF signal path and the LO signal path are determined from the measured output signals. Determining the passband response of each of the RF signal path and the LO signal path includes determining an amplitude and phase response resulting from a transfer function corresponding to each of the signal paths, as illustrated in FIG. 3, in response to the calibration signals being transmitted into the RF and LO signal paths.

In accordance with an embodiment, determining the passband response of each of the RF signal path and the LO signal path in block 208 includes performing a point-by-point analysis on the measured output signals. An example of a method 600 for performing a point-by-point analysis of the measured output signals from the IF signal path will be described with reference to FIGS. 6A and 6B.

In accordance with another embodiment, determining the passband response of each of the RF signal path, the LO signal path and the IF signal path includes performing a least squares analysis on the measured output signals from the IF signal path in response to transmitting the calibration signals respectively through the RF and LO signal paths for a predetermined frequency range. An example of a method 800 for performing a least squares analysis on the measured output signals from the IF signal path will be described with reference to FIGS. 8A and 8B.

In block 210, a second set of calibration signals are transmitted into the RF and LO signal paths for determining the passband response of the IF signal path. In accordance with an embodiment, the second set of calibration signals includes a second set of RF calibration signals transmitted into the RF signal path and at least a single LO calibration signal transmitted into the LO signal path. In block 212, the output signals are measured from the output of the IF signal path.

In block 214, the passband response of the IF signal path is determined from the measured output signals and passband response for each of the RF and LO signal paths determined in block 208. Determining the passband response of each of the RF signal path, the LO signal path and the IF signal path includes determining an amplitude and phase response resulting from a transfer function corresponding to each of the signal paths in response to the calibration signals being transmitted into the RF and LO signal paths. The passband response of the IF signal path is determined using the amplitude and phase response for the RF signal path and LO signal path.

In block 216, compensation for distortions and/or non-linearities in the RF signal path, the LO signal path and the IF signal path is performed using the passband response of each signal path. Compensating for distortions and/or non-linearities is performed in an exciter/receiver of the radar system without using devices that are not components or the radar system or using only components of the radar system. In accordance with an embodiment, compensating for distortions and/or non-linearities in each of the signal paths includes generating a compensation filter that compensates for the distortions and/or non-linearities caused by at least hardware components of each of the signal paths. Filter parameters or characteristics for the compensation filter are determined using the passband response of transfer function of each signal path. As previously described, the compensation filter includes a transfer function that is equal to an inverse of the transfer functions of the signal paths to compensate for the distortions and non-linearities in the signal paths.

In block 218, the parameters in the compensation filter are adjusted or set using the filter parameters or transfer function coefficients determined using the passband responses of the signal paths to restore the radar signals received by the radar system to undistorted waveforms.

In block 220, the switching device is operated to a normal operating position or mode to open or disconnect the calibration loop-back signal path. In block 222, the radar system or regenerative radar is operated to transmit RF or radar signals and receive return or reflected radar signals.

In block 224, the return or reflected radar signals are filtered by the compensation filter to compensate for distortions and/or non-linearities in the RF, LO and IF signal paths, thereby restoring the return or reflected radar signals to undistorted waveforms.

In block 226, the filtered, undistorted radar signals are processed in the radar processing hardware.

As previously described with reference to FIG. 3, the radar system 100 is self-calibrated by representing the RF signal path 124, LO signal path 126 and IF signal path 128, respectively, by transfer functions F(f) 302, G(f) 304, and H(f) 306. Because of a frequency conversion due to the non-linear frequency mixing, each signal path 124, 126 and 128 will operate over different frequency ranges. The frequency relationship is given by Equation 2:

$$f_{IF} = f_{RF} \pm f_{LO} \quad \text{Equation 2}$$

RF signals are transmitted into the RF signal path 124 and the LO signal path 126 and a measurement of the output signal 129 is made at the output 130 of the IF signal path 128 by the measurement/calibration module 170 of the self-compensation structure 106. The measurements by the measurement/calibration module 170 are characterized by Equation 3:

$$M(f_{RF}, f_{LO}, f_{IF}) = F(f_{RF}) \cdot G(f_{LO}) \cdot H(f_{IF}) \quad \text{Equation 3}$$

The transfer functions F(f) 302, G(f) 304, and H(f) 306 are complex numbers which include amplitude and phase response components:

$$F(f_{RF}) = a_{RF}(f_{RF}) \cdot e^{j\phi_{RF}(f_{RF})} \quad \text{Equation 4}$$

$$G(f_{LO}) = a_{LO}(f_{LO}) \cdot e^{j\phi_{LO}(f_{LO})} \quad \text{Equation 5}$$

$$H(f_{IF}) = a_{IF}(f_{IF}) \cdot e^{j\phi_{IF}(f_{IF})} \quad \text{Equation 6}$$

Using Equations 4-6, Equation 3 may be rewritten as two sets of equations where the amplitude and phase response components are summations:

$$M_A(f_{RF}, f_{LO}, f_{IF}) = A_{RF}(f_{RF}) + A_{LO}(f_{LO}) + A_{IF}(f_{IF}) \quad \text{Equation 7}$$

$$M_\phi(f_{RF}, f_{LO}, f_{IF}) = \phi_{RF}(f_{RF}) + \phi_{LO}(f_{LO}) + \phi_{IF}(f_{IF}) \quad \text{Equation 8}$$

Where $A_{RF}$, $A_{LO}$, and $A_{IF}$ are the amplitudes of $F(f_{RF})$, $G(f_{LO})$, and $H(f_{IF})$ expressed in decibels and are related to the amplitudes in Equations 4 to 6 by $$A = 10 \log_{10}(a) \quad \text{Equation 9}$$

Figure 8A:
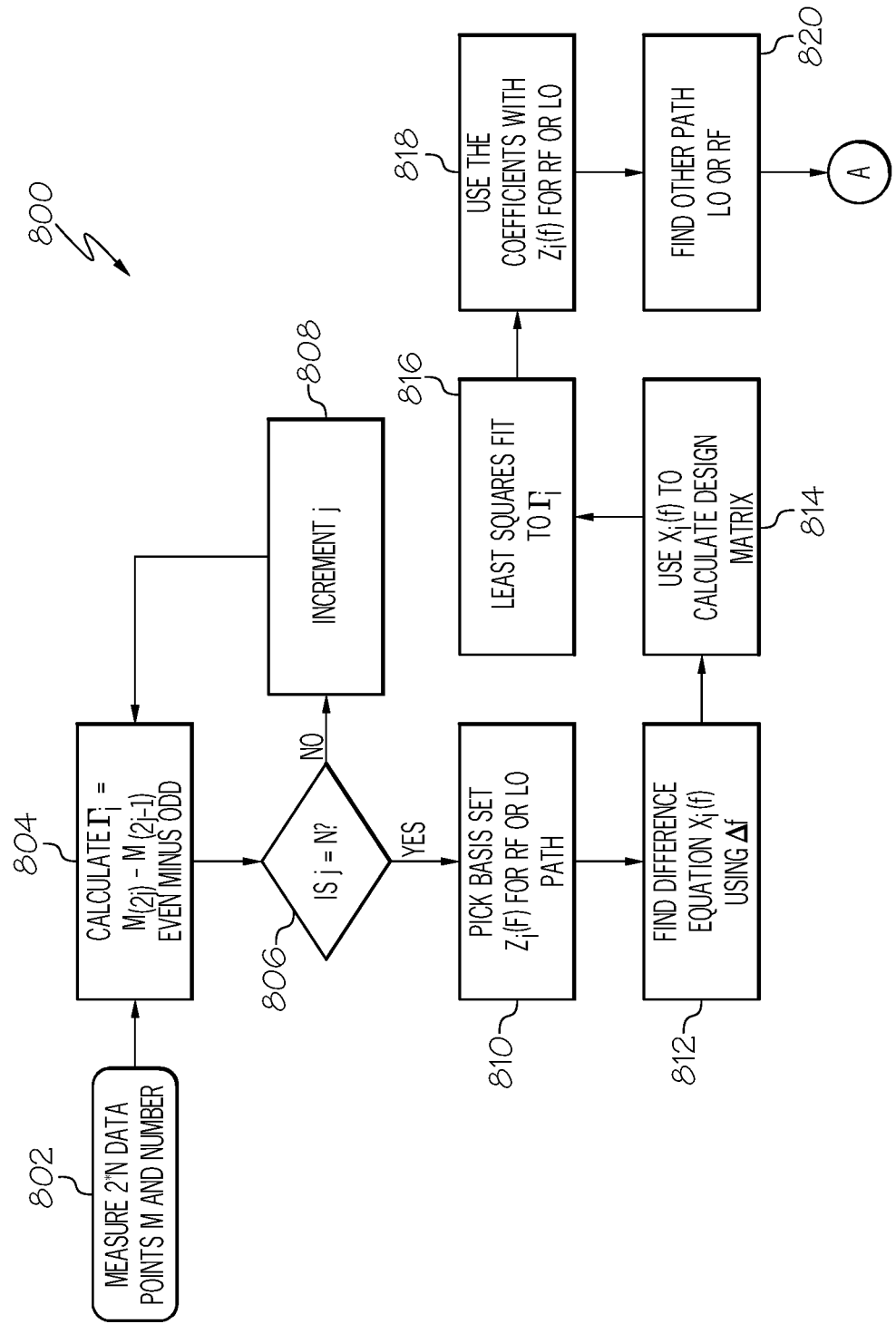
FIGS. 8A and 8B are a flow chart of an example of a method for characterizing or determining a passband response of each of the RF, LO and IF signal paths using least squares across different frequency calibration signals through RF and LO signal paths for self-compensating the radar system in accordance with an embodiment of the present disclosure.
Figure 8B:
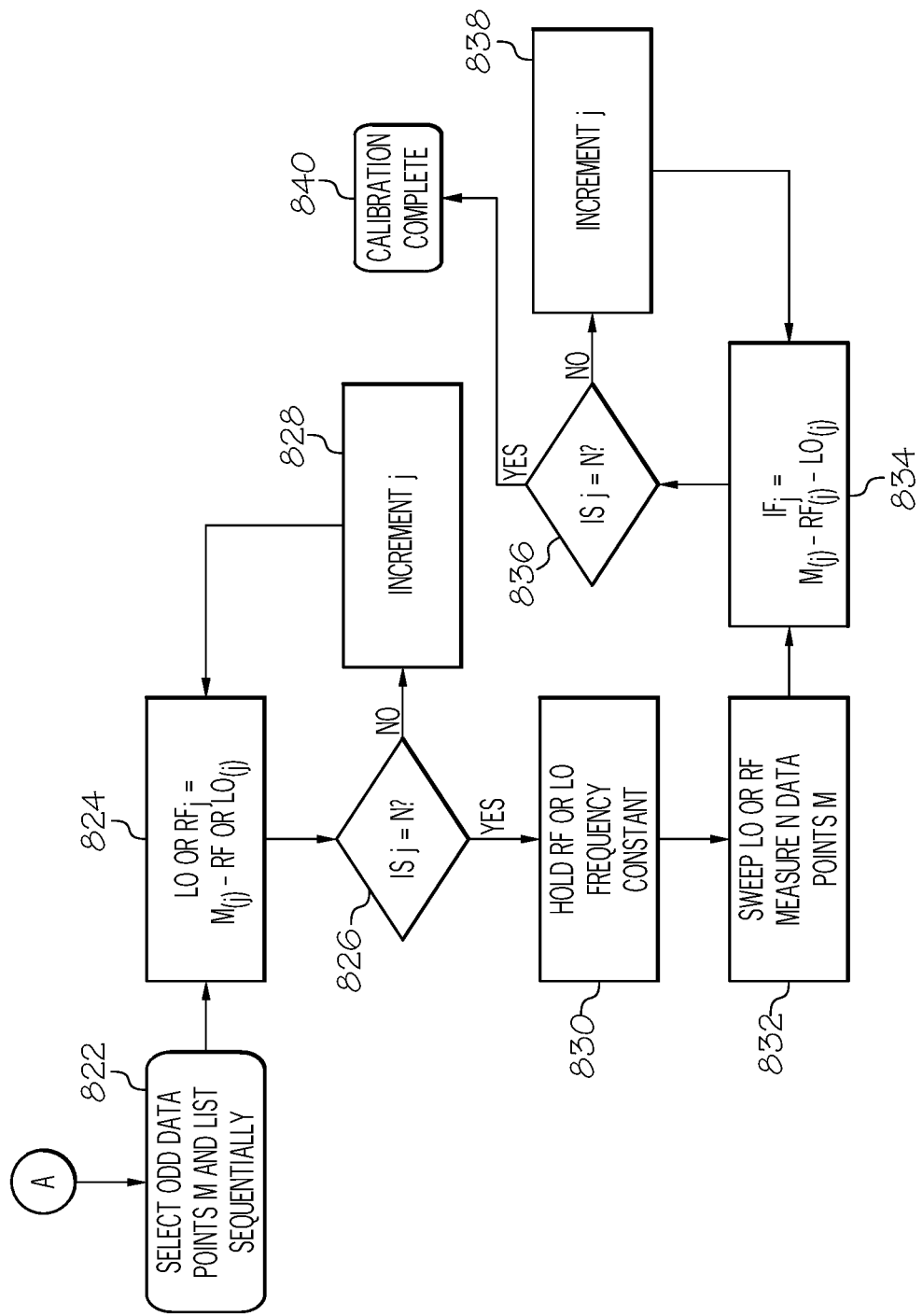

The series of measurements represented by Equation 3 are performed at different frequencies. Referring also to FIG. 5, FIG. 5 is an illustration of a set of calibration signals 137 transmitted into the RF signal path 124 and LO signal path 126 for determining or characterizing a passband response of each signal path 124, 126 and 128 in accordance with an embodiment of the present disclosure. FIG. 5 is a plot showing frequency versus time to show the RF and LO frequencies with IF being shown as the difference based on Equation 2. Multiple RF signals can be generated simultaneously by the coupled TX/LO waveform generator 104. The example in FIG. 5 shows five RF calibration signals 137*a* and a single LO calibration signal 137*b*. A measurement of the IF output signal 129 is performed at each point 502 in time as the RF and LO frequencies are swept. The RF signal path 124 has a range of operation so only the IF frequencies in that range are used. From this process, a set of n measurements ($M_1, M_2, \ldots M_n$) are made at frequencies that follow a predetermined frequency plan. The method 600 described with reference to FIGS. 6A-6B or the method 800 described with reference to FIGS. 8A-8B are used to obtain the transfer functions F(f) 302, G(f) 304, and H(f) 306 or amplitude and phase response distortion for each signal path 124, 126 and 128 from the set of measurements ($M_n$).

Figure 6A:
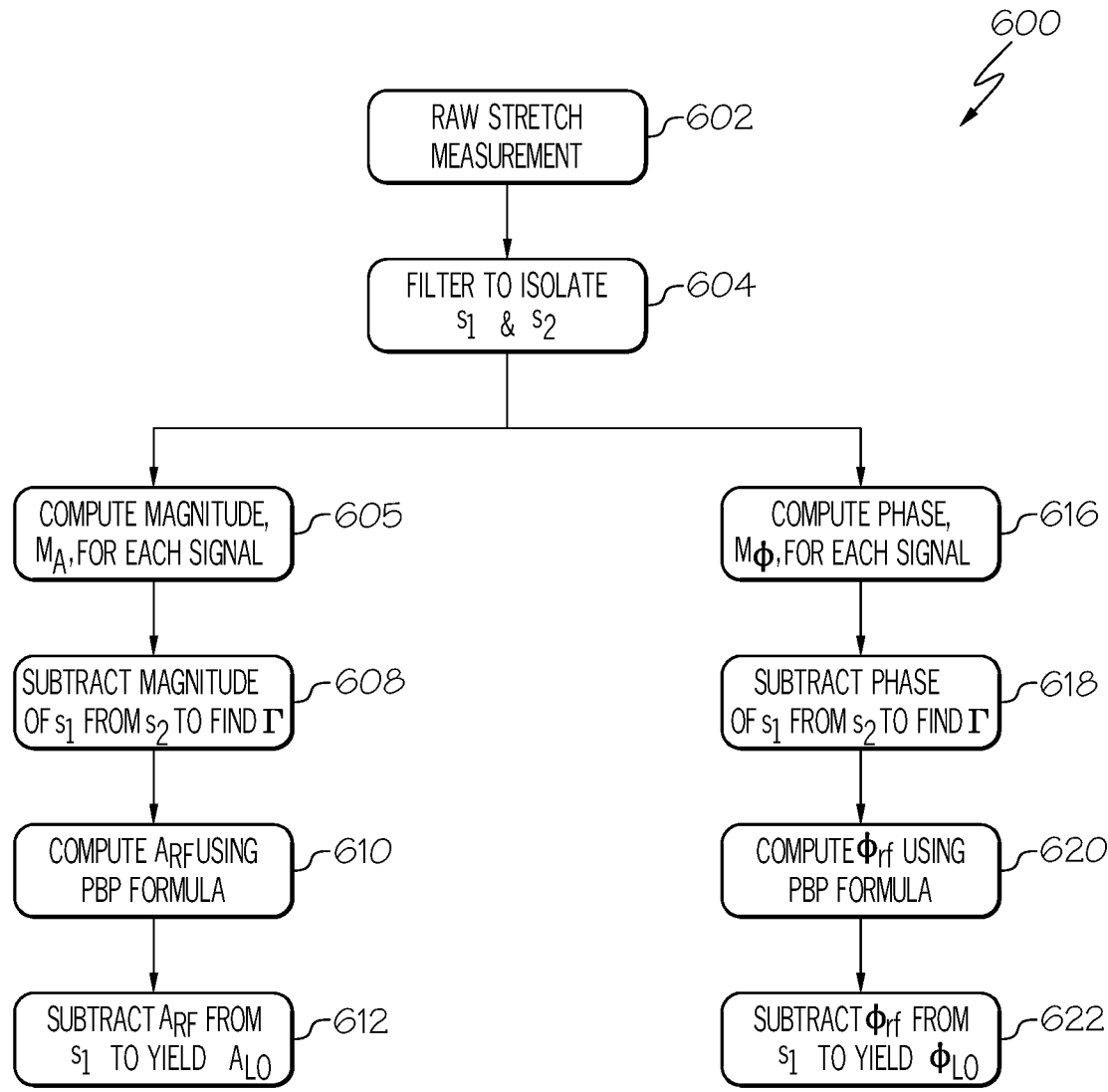
FIGS. 6A and 6B are a flow chart of an example of a method for characterizing or determining a passband response of each of the RF, LO and IF signal paths using point-by-point analysis for self-compensating the radar system in accordance with an embodiment of the present disclosure.
Figure 6B:
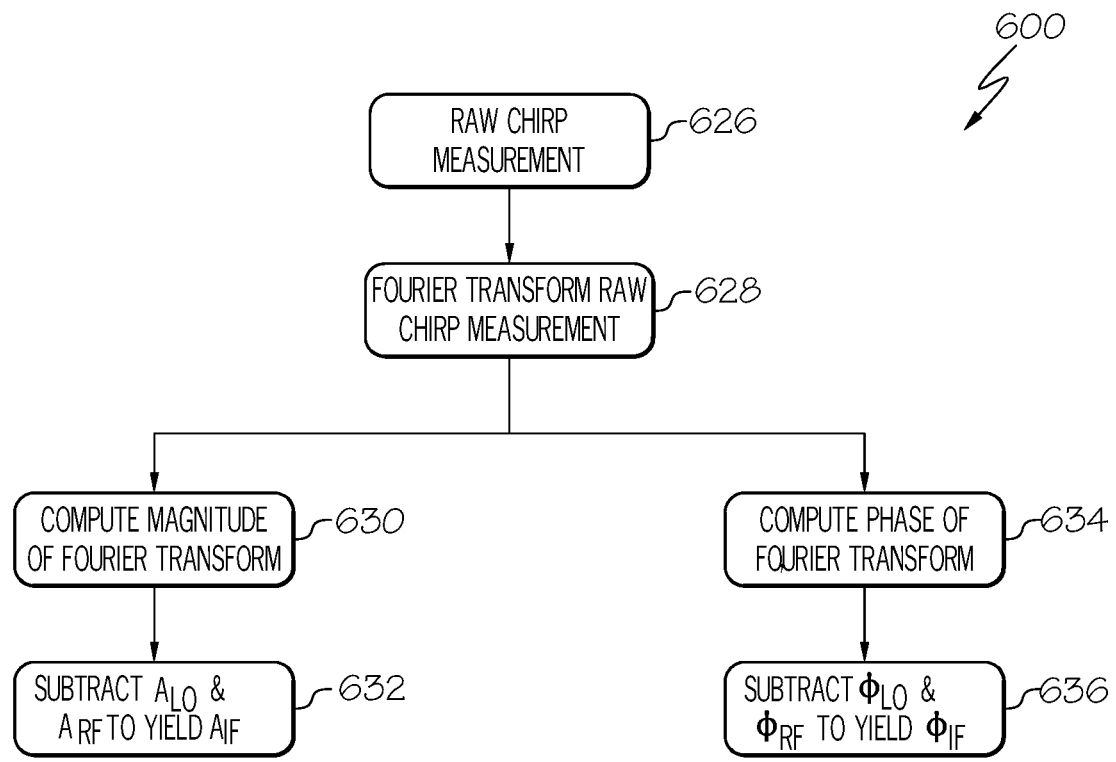

FIGS. 6A and 6B are a flow chart of an example of a method 600 for characterizing or determining a passband response of each of the RF, LO and IF signal paths 124, 126 and 128 using point-by-point analysis for self-compensating the radar system 100 in accordance with an embodiment of the present disclosure. In accordance with an embodiment, the method 600 is embodied in and performed by the measurement/calibration module 170. In block 602, the raw stretch measurement of the IF output signals 129 represented by Equation 3 are obtained.

Figure 7:
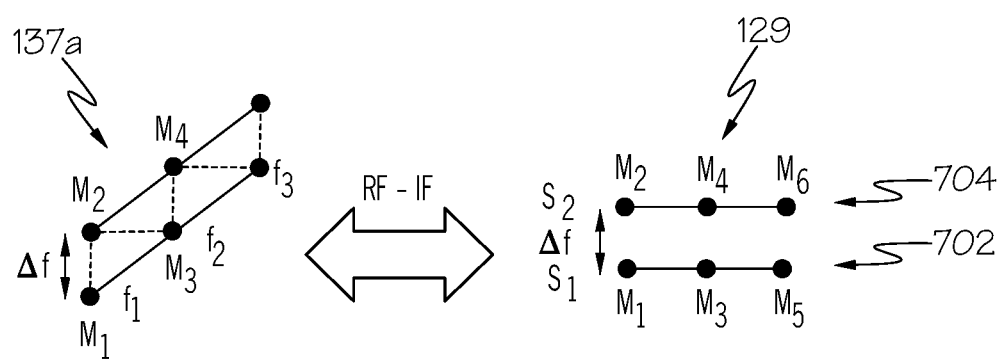
FIG. 7 illustrates how the RF calibration signals are transformed when mixed with the LO calibration signals and the position of measurement points both before and after mixing in accordance with an embodiment of the present disclosure.

In block 604, the measurement of the IF output signals are filtered to isolate the measurements or separate the signals by a predetermined frequency differential $\Delta f$. Referring also to FIG. 7, FIG. 7 illustrates how the RF calibration signals 137*a* are transformed when mixed with the LO calibration signals 137*b* and the position of measurement points both before and after mixing in accordance with an embodiment of the present disclosure. The measured output signals 129 are filtered to isolate odd IF measurements ($s_1$) 702 and even IF measurements ($s_2$) 704 in the point-by-point analysis or to separate signal measurements at the same time separated by the frequency differential $\Delta f$. The odd set of measurements $s_1$ 702 are represented by Equation 10 and the even set of measurements $s_2$ 704 are represented by Equation 11:

$$s_1 = \begin{bmatrix} M_1 \\ M_3 \\ \vdots \\ M_{m-1} \end{bmatrix} = \begin{bmatrix} 10^{(M_{A1}/10)} \cdot e^{jM_{\phi 1}} \\ 10^{(M_{A3}/10)} \cdot e^{jM_{\phi 3}} \\ \vdots \\ 10^{(M_{A(n-1)}/10)} \cdot e^{jM_{\phi(m-1)}} \end{bmatrix} \quad \text{Equation 10}$$

$$s_1 = \begin{bmatrix} M_2 \\ M_4 \\ \vdots \\ M_m \end{bmatrix} = \begin{bmatrix} 10^{(M_{A2}/10)} \cdot e^{jM_{\phi 2}} \\ 10^{(M_{A4}/10)} \cdot e^{jM_{\phi 4}} \\ \vdots \\ 10^{(M_{Am}/10)} \cdot e^{jM_{\phi m}} \end{bmatrix} \quad \text{Equation 11}$$

In block 606, a magnitude, $M_A$, is computed for each signal according to Equation 12:

$$M_A = 10 \log_{10} |M| \quad \text{Equation 12}$$

$M_A$ is in terms of dB. In block 608, the magnitude of $s_1$ and $s_2$ are subtracted using Equation 13 to find gamma ($\Gamma$), the first two values of gamma corresponding to Equations 14 and 15:

$$\Gamma = 10 \log_{10}|s_2| - 10 \log_{10}|s_1| \quad \text{Equation 13}$$

$$\Gamma_1 = M_{A2} - M_{A1} = A_{RF}(f_2) - A_{RF}(f_1) + (A_{IF}(f_{IF2}) - A_{IF}(f_{IF1})) \quad \text{Equation 14}$$

$$\Gamma_2 = M_{A4} - M_{A3} = A_{RF}(f_3) - A_{RF}(f_2) + (A_{IF}(f_{IF2}) - A_{IF}(f_{IF1})) \quad \text{Equation 15}$$

In block 610, the RF amplitude response ($A_{RF}$) is computed using the point-by-point formula according to equations 16 and 17:

$$A_{RF}(f_1) \stackrel{\Delta}{=} 0 \quad \text{Equation 16}$$

$$A_{RF}(f_n) = \sum_{i=1}^{n-1} \Gamma_i = \sum_{i=1}^{n-1} [M_{A_{2i}} - M_{A_{(2i-1)}}] \quad \text{Equation 17}$$

Where the IF signals are assumed close enough that the IF passband response is assumed to be flat.

In block 612, $A_{RF}$ is subtracted from $s_1$ to yield the LO amplitude response ($A_{LO}$) according to Equations 18:

$$A_{LO} = 10 \log_{10} |s_1| - \begin{bmatrix} A_{RF}(f_1) \\ A_{RF}(f_2) \\ \vdots \\ A_{RF}(f_n) \end{bmatrix} \quad \text{Equation 18}$$

In block 616, the phase, $M_\phi$ is computed for each signal according to Equation 19:

$$M_\phi = \angle M \quad \text{Equation 19}$$

In block 618, the phase of $s_1$ is subtracted from $s_2$ using Equation 20 to determine $\Gamma$ according to Equations 21 and 22:

$$\Gamma = \angle s_2 - \angle s_1 \quad \text{Equation 20}$$

$$\Gamma_1 = (M_{\phi 2} - M_{\phi 1}) = \phi_{RF}(f_2) - \phi_{RF}(f_1) + (\phi_{IF}(f_{IF2}) - \phi_{IF}(f_{IF1})) \quad \text{Equation 21}$$

$$\Gamma_2 = (M_{\phi 4} - M_{\phi 3}) = \phi_{RF}(f_3) - \phi_{RF}(f_2) + (\phi_{IF}(f_{IF2}) - \phi_{IF}(f_{IF1})) \quad \text{Equation 22}$$

The LO terms are common to both signals and cancel out.

In block 620, $\phi_{RF}$ is computed using the point-by-point formula using Equations 23 and 24:

$$\phi_{RF} \stackrel{\Delta}{=} 0 \quad \text{Equation 23}$$

$$\phi_{RF}(f_n) = \sum_{i=1}^{n-1} \delta_i = M_{i=1}^{n-1} [M_{\phi 2i} - M_{\phi(2i-1)}] \quad \text{Equation 24}$$

In block 622, $\phi_{RF}$ is subtracted from $s_1$ to yield $\phi_{LO}$ according to Equations 25:

$$\phi_{LO} = \angle s_1 - \begin{bmatrix} \phi_{RF}(f_1) \\ \phi_{RF}(f_2) \\ \vdots \\ \phi_{RF}(f_n) \end{bmatrix} \quad \text{Equation 25}$$

In block 626 (FIG. 6B), the raw chirp measurements of the IF output signals $M_1$-$M_n$ in FIG. 7 are obtained and Fourier transformed in block 628. In block 630, a magnitude is determined from the Fourier transforms. In block 632, the magnitude or amplitude response of the IF transfer function ($A_{IF}$) is determined from the difference of the RF amplitude response ($A_{RF}$) of the RF transfer function F(f) 302 and the LO amplitude response ($A_{LO}$) of the LO transfer function G(f) 304 according to Equation 7.

Similarly, in block 634, the phase is determined from the Fourier transforms in block 628. In block 636, the phase of the IF transfer function ($\phi_{IF}$) is determined from the difference of the RF phase ($\phi_{RF}$) of the RF transfer function F(f) 302 and the LO phase ($\phi_{LO}$) of the LO transfer function G(f) 304 according to Equation 8.

FIGS. 8A and 8B are a flow chart of an example of a method 800 for characterizing or determining a passband response of each of the RF, LO and IF signal paths 124, 126 and 128 using least squares across different frequencies of calibration signals through the RF signal path 124 and LO signal path 126 for self-compensating the radar system 100 in accordance with an embodiment of the present disclosure. In accordance with an embodiment, the method 800 is embodied in and performed by the measurement/calibration module 170. In block 802, the IF output signals 129 are measured to provide $M_1$-$M_n$ data points.

In block 804, a difference equation ($\Gamma_j$) similar to Equation 23 is used to determine the difference between even and odd measurement points ($M_{(2j)}$-$M_{(2j-1)}$). In blocks 806 and 808, the method 800 loops back to block 804 to determine the difference equation ($\Gamma_j$) between all even and odd measurement points by iterating through all measurement points.

In block 810, a basis set is picked for Z(f) for the RF signal path 124 and the LO signal path 126. Z(f) is the basis function of the RF or LO signal path according to Equation 26:

$$\phi_{RF}(f) = \sum_{i=1}^{N} (\alpha_i \cdot Z_i(f))$$ Equation 26

In block 812, a difference equation $X_i(f)$ is found using $\Delta f$ accordingly to Equation 27:

$$X_i(f) = Z_i(f+\Delta f) - Z_i(f)$$ Equation 27

In block 814, Xi(f) is used to calculate a design matrix. In block 816, a least squares fit is applied to the difference equation ($\Gamma_j$). In block 818, the coefficients are used with Z(f) for determining the passband response of the transfer function for the RF signal path or the LO signal path. In block 820, the passband response for the other signal path of the LO signal path or RF signal path is found.

In block 822 (FIG. 8B), the odd data points or measurements ($M_{odd}$) are selected and listed sequentially. In block 824, the passband response for the transfer function of the RF signal path or LO signal path is determined according to Equation 28:

$$\text{LO or RF}_j = M_{(j)} - \text{RF or LO}_{(j)}$$ Equation 28

In blocks 826 and 828, the method 800 loops back to block 824 to determine the passband response of the RF or LO signal path using all of the N measurements or data points ($M_N$). After the passband response for the RF or LO signal path has been determined for all measurements or data points, the method 800 advances to block 830.

In block 830, the RF frequency or LO frequency is held constant. In block 832, the other of the RF frequency or LO frequency is sweep to measure the N data points ($M_N$). In block 834, the passband response of the transfer function for the IF signal path is determined according to Equation 29:

$$\text{IF}_j = M_{(j)} - \text{RF}_{(j)} - \text{LO}_{(j)}$$ Equation 29

In blocks 836 and 838, the method 800 loops back to block 834 to determine the passband response of the IF signal path using all N measurement data points ($M_N$). After determining the passband response of the IF signal path using all measurement data points, the method 800 advances to block 840. In block 840, the calibration is complete.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A method for self-calibrating a radar system, comprising:

forming a calibration loop-back signal path, wherein forming the calibration loop-back signal path comprises electrically connecting a transmit assembly to a receive assembly of the radar system and wherein the calibration loop-back signal path is configured for determining a passband response of each of a radio frequency (RF) signal path, a local oscillator (LO) signal path, and an intermediate frequency (IF) signal path of the radar system;

transmitting a set of calibration signals into the RF signal path and the LO signal path by a signal generator;

measuring output signals from the IF signal path in a receiver of the radar system in response to the set of calibration signals transmitted into the RF signal path and the LO signal path;

determining the passband response of each of the RF signal path, the LO signal path and the IF signal path by performing an analysis of the measured output signals; and compensating for distortions and/or non-linearities in the RF signal path, the LO signal path and the IF signal path using the passband response of each signal path.

2. The method of claim 1, wherein forming the calibration loop-back signal path comprises operating a switching device to electrically connect the transmit assembly to the receive assembly of the radar system.

3. The method of claim 1, wherein transmitting the set of calibration signals into the RF signal path and the LO signal path comprises:

transmitting a set of RF calibration signals into the RF signal path by a coupled transmit/local oscillator (TX/LO) waveform generator; and transmitting an LO calibration signal into the LO signal path by the coupled TX/LO waveform generator.

4. The method of claim 3, wherein the calibration signals each comprise a linear frequency modulated (LFM) pulse waveform.

5. The method of claim 1, wherein compensating for distortions and/or non-linearities is performed in an exciter/receiver of the radar system using only devices that are components of the radar system.

6. The method of claim 1, wherein determining the passband response of each of the RF signal path, the LO signal path and the IF signal path comprises determining an amplitude and phase response resulting from a transfer function corresponding to each of the signal paths.

7. The method of claim 6, wherein determining the passband response of each of the RF signal path, the LO signal path and the IF signal path comprises performing a point-by-point analysis on the measured output signals.

8. The method of claim 6, wherein determining the passband response of each of the RF signal path, the LO signal path and the IF signal path comprises performing a least squares analysis on the measured output signals respectively through the RF and LO signal paths for a predetermined frequency range.

9. The method of claim 1, wherein compensating for distortions and/or non-linearities in each of the signal paths comprises generating a compensation filter that compensates for the distortions and/or non-linearities caused by hardware components of each of the signal paths.

10. The method of claim 9, wherein compensating for distortions and/or non-linearities in each of the signal paths comprises determining filter parameters or characteristics using the passband response of each signal path.

11. The method of claim 10, further comprising:

adjusting or setting the parameters in the compensation filter; and filtering radar signals received by the radar system by the compensation filter before processing the filtered radar signals.

12. A method for self-calibrating a radar system, comprising:

coupling a coupled transmit/local oscillator (TX/LO) waveform generator to a self-compensation structure by forming a calibration loop-back signal path, wherein forming the calibration loop-back signal path comprises electrically connecting a transmit assembly to a receive assembly of the radar system and wherein the calibration loop-back signal path is configured for determining a passband response of each of a radio frequency (RF) signal path, a local oscillator (LO) signal path, and an intermediate frequency (IF) signal path, wherein the coupled TX/LO waveform generator and the self-compensation structure are components of an exciter/receiver of the radar system;

transmitting a first set of calibration signals into the RF signal path and the LO signal path by the coupled TX/LO waveform generator;

measuring output signals from the IF signal path by the self-compensation structure in response to the first set of calibration signals;

transmitting a second set of calibration signals into the RF signal path and the LO signal path by the coupled TX/LO waveform generator;

measuring output signals from the IF signal path by the self-compensation structure in response to the second set of calibration signals;

determining the passband response of each of the RF signal path, the LO signal path and the IF signal path by performing an analysis of the measured output signals by the self-compensation structure; and compensating for distortions and/or non-linearities in the RF signal path, the LO signal path and the IF signal path by the self-compensation structure using the passband response of each signal path.

13. The method of claim 12, wherein compensating for distortions and/or non-linearities is performed in the exciter/receiver of the radar system using only devices that are components of the radar system.

14. The method of claim 12, wherein determining the passband response of each the RF signal path, the LO signal path and the IF signal path comprises determining an amplitude and phase response resulting from a transfer function corresponding to each of the signal paths.

15. The method of claim 14, wherein determining the passband response of each of the RF signal path, the LO signal path and the IF signal path comprises performing a point-by-point analysis on the measured output signals.

16. The method of claim 14, wherein determining the passband response of each of the RF signal path, the LO signal path and the IF signal path comprises performing a least squares analysis on the measured output signals respectively through the RF and LO signal paths for a predetermined frequency range.

17. The method of claim 14, wherein compensating for distortions and/or non-linearities in the RF signal path, the LO signal path and the IF signal path by the self-compensation structure using the passband response of each signal path.

18. A radar system, comprising:

a transmit assembly;

a receive assembly;

a calibration loop-back signal path formed in response to a switching device being operated to couple the transmit assembly to the receive assembly, the calibration loop-back signal path being configured for determining a passband response of each of a radio frequency (RF) signal path, a local oscillator (LO) signal path, and an intermediate frequency (IF) signal path of the radar system;

a coupled transmit/local oscillator (TX/LO) waveform generator configured for transmitting a set of calibration signals into the RF signal path and the LO signal path; and a self-compensation structure configured to perform a set of functions comprising:

measuring output signals from the IF signal path in response to the calibration signals;

determining the passband response of each of the RF signal path, the LO signal path and the IF signal path by performing an analysis of the measured output signals; and compensating for distortions and/or non-linearities in the RF signal path, the LO signal path and the IF signal path using the passband response of each signal path.

19. The radar system of claim 18, wherein the self-compensation structure comprises a compensation filter configured for compensating for distortions and/or non-linearities in the RF signal path, the LO signal path and the IF signal path using the passband response of each signal path.

20. The radar system of claim 18, further comprising an exciter/receiver, wherein the exciter/receiver comprises the coupled TX/LO waveform generator and the self-compensation structure.

* * * * *